US012692832B2

(12) United States Patent
Garcia Pouso

(10) Patent No.: US 12,692,832 B2
(45) Date of Patent: Jul. 28, 2026

(54) ROOT BUSHING, WIND TURBINE ROTOR BLADE AND METHOD

(71) Applicant: Siemens Gamesa Renewable Energy Innovation & Technology S.L., Sarriguren (ES)

(72) Inventor: Alberto Garcia Pouso, Pamplona (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 18/118,380

(22) Filed: Mar. 7, 2023

(65) Prior Publication Data

US 2023/0287862 A1     Sep. 14, 2023

(30) Foreign Application Priority Data

Mar. 14, 2022     (EP) ..................................... 22382243

(51) Int. Cl.
*F03D 1/06*          (2006.01)
*B29C 70/86*       (2006.01)
*B29L 31/08*       (2006.01)

(52) U.S. Cl.
CPC .............. *F03D 1/066* (2023.08); *B29C 70/86* (2013.01); *F03D 1/0658* (2013.01); *B29L 2031/085* (2013.01); *F05B 2230/30* (2013.01); *F05B 2240/221* (2013.01); *F05B 2250/231* (2013.01); *F05B 2250/232* (2013.01)

(58) Field of Classification Search
CPC ...... F03D 1/0658; F03D 1/066; F03D 1/0677; B29C 33/42; B29C 70/52–525; B29C 53/585
See application file for complete search history.

(56) References Cited

U.S. PATENT DOCUMENTS

| | | | | |
|---|---|---|---|---|
| 5,160,392 A * | 11/1992 | Thongs, Jr. | ............. | B29C 70/86 |
| | | | | 156/175 |
| 5,167,742 A * | 12/1992 | Peters | ................. | B29C 66/1162 |
| | | | | 156/425 |
| 8,172,538 B2 * | 5/2012 | Hancock | ................. | F03D 80/30 |
| | | | | 416/241 A |
| 9,995,271 B2 * | 6/2018 | Dahl | ..................... | F03D 1/0658 |
| 10,309,369 B2 * | 6/2019 | Dahl | ..................... | F03D 1/0658 |
| 11,339,761 B2 * | 5/2022 | Wang | ..................... | F03D 13/10 |
| 11,408,392 B2 * | 8/2022 | Smith | ................... | F03D 1/0658 |
| 11,530,679 B2 * | 12/2022 | Smith | ................... | F03D 1/0658 |

(Continued)

FOREIGN PATENT DOCUMENTS

| | | | | |
|---|---|---|---|---|
| CA | 2893720 A1 | 12/2015 | | |
| CN | 106438195 A * | 2/2017 | ............. | B29C 70/36 |

(Continued)

*Primary Examiner* — Topaz L. Elliott
(74) *Attorney, Agent, or Firm* — Schmeiser Olsen PLLC

(57)          ABSTRACT

A root bushing for a wind turbine rotor blade is provided, including a plurality of fiber material layers and an insert, wherein the insert is embedded in the fiber material layers, and wherein at least a part of the fiber material layers forms a double scarf joint for transferring loads from the insert to the fiber material layers and vice versa. Due to the double scarf joint it is possible to transfer high loads from the fiber material layers and vice versa. A less load resilient joint like double lap shear joint can be omitted.

13 Claims, 8 Drawing Sheets

(56)　　　　　References Cited

U.S. PATENT DOCUMENTS

| | | | | |
|---|---|---|---|---|
| 2005/0106029 A1 * | 5/2005 | Kildegaard | B29C 70/86 | 416/229 R |
| 2008/0206059 A1 * | 8/2008 | Hancock | B29C 70/84 | 416/213 R |
| 2012/0163905 A1 * | 6/2012 | Bond | B29C 70/86 | 29/428 |
| 2014/0030094 A1 * | 1/2014 | Dahl | B29C 70/885 | 416/217 |
| 2014/0030096 A1 * | 1/2014 | Dahl | F03D 1/0658 | 416/217 |
| 2014/0234109 A1 * | 8/2014 | Hayden | F03D 3/062 | 29/889.7 |
| 2015/0354542 A1 * | 12/2015 | Kratmann | F16B 37/122 | 416/223 A |
| 2017/0045032 A1 * | 2/2017 | Jacobsen | F03D 1/0658 | |
| 2018/0372062 A1 * | 12/2018 | Messmer | F03D 1/0675 | |
| 2020/0095867 A1 | 3/2020 | Schibsbye | | |
| 2020/0300215 A1 * | 9/2020 | Wang | F03D 13/00 | |
| 2020/0347820 A1 * | 11/2020 | Smith | F03D 1/0675 | |
| 2020/0392936 A1 * | 12/2020 | Smith | F03D 1/0658 | |
| 2023/0083629 A1 * | 3/2023 | Razeghi | F03D 1/0675 | 416/230 |

FOREIGN PATENT DOCUMENTS

| | | | | | |
|---|---|---|---|---|---|
| DE | 10214340 C1 | * | 11/2003 | | B29C 70/24 |
| EP | 2677170 A1 | * | 12/2013 | | F03D 1/0658 |
| EP | 2952739 A1 | | 12/2015 | | |
| EP | 3441567 A1 | | 2/2019 | | |
| FR | 2863318 A1 | * | 6/2005 | | F03D 1/0608 |
| JP | 2003293935 A | * | 10/2003 | | |
| KR | 101590795 B1 | * | 2/2016 | | |
| KR | 102349380 B1 | * | 1/2022 | | |
| WO | WO-2016048148 A1 | * | 3/2016 | | F03D 1/0675 |
| WO | WO 2021219198 A1 | | 11/2021 | | |
| WO | WO-2023117010 A1 | * | 6/2023 | | |

* cited by examiner

ROOT BUSHING, WIND TURBINE ROTOR BLADE AND METHOD

CROSS-REFERENCE TO RELATED APPLICATIONS

This application claims priority to EP Application No. 22382243.8, having a filing date of Mar. 14, 2022, the entire contents of which are hereby incorporated by reference.

FIELD OF TECHNOLOGY

The following relates to a root bushing for a wind turbine rotor blade, a wind turbine rotor blade comprising such a root bushing and a method for manufacturing such a root bushing.

BACKGROUND

Wind turbine rotor blades are built from fiber-reinforced plastics. A rotor blade typically comprises an airfoil having a rounded leading edge and a sharp trailing edge. The rotor blade is connected with its blade root to a hub of the wind turbine. The blade root comprises at least one or a plurality of root bushing. The root bushings can be provided with internal threads. Bolts are engaged with these internal threads to connect the blade root to the hub.

SUMMARY

An aspect relates to an improved root bushing for a wind turbine rotor blade.

Accordingly, a root bushing for a wind turbine rotor blade is provided. The root bushing comprises a plurality of fiber material layers and an insert, wherein the insert is embedded in the fiber material layers, and wherein at least a part of the fiber material layers forms a double scarf joint for transferring loads from the insert to the fiber material layers and vice versa.

Due to the double scarf joint, higher loads can be transferred from the insert to the fiber material layers and vice versa compared to other kinds of joints.

The root bushing is part of the wind turbine rotor blade. The wind turbine rotor blade comprises a plurality of root bushings. The root bushings are placed in a blade root of the wind turbine rotor blade. The root bushings can receive bolts for attaching the blade root to a hub of a wind turbine.

The fiber material layers are glass fiber layers. The fiber material layers can be wound on the insert by a tape winding machine. This can be done automatically. However, the fiber material layers can be wound on the insert manually. The fiber material layers can be unidirectional layers (UD-layers). The fiber material layers are wound on the insert in a dry state. The fiber material layers are then impregnated with a resin to form the root bushing. This can be done in a resin transfer molding (RTM) process.

The insert is made of metal. For example, the insert can be made of steel or aluminum. The insert can be a machined or cast part. The insert is rotationally symmetrical to a symmetry axis. The insert comprises a central bore that protrudes throughout the complete insert. The bore has a thread section with an internal thread. A bolt can be screwed into that thread section to attach the blade root comprising the root bushing to the hub of the wind turbine. Since the root bushing comprises the insert and the fiber material layers, the root bushing can be named hybrid root bushing.

"Embedded" in the fiber material layers in the context with the insert means that the fiber material layers are wound around the insert. The insert can be completely or partially covered with the fiber material layers. Some of the fiber material layers together form the double scarf joint.

A "scarf joint" in this context means that a contact between an outer surface of the insert and the fiber material layers that form the double scarf joint is arranged in an angle of less than 90°, preferably less than 80°, more preferably less than 70°, more preferably less than 60°, more preferably less than 50°, more preferably less than 40°, more preferably less than 30°, more preferably less than 20°, more preferably less than 10°, toward the symmetry axis of the insert. Thus, the scarf joint has a frustoconical or cone shaped geometry.

"Double" in the context with the scarf joint means that the double scarf joint has a doubled frustoconical or cone shaped geometry. In other words, the double scarf joint comprises two frustoconical or cone shaped geometries that are arranged inversely or oppositely. "Inversely" or "oppositely" in this context means that tips of the frustoconical or cone shaped geometries face each other, and bases of the frustoconical or cone shaped geometries face away from each other. A "tip" in contrast to a "base" of the frustoconical or cone shaped geometry has a smaller diameter than the base.

According to an embodiment, the insert comprises an outer surface with a double cone section, wherein the double scarf joint is formed at the double cone section.

The outer surface is rotation symmetric to the symmetry axis of the insert. The double cone section is filled with the fiber material layers in a stepped or staggered way to form the double scarf joint.

According to a further embodiment, the double cone section comprises a first cone area and a second cone area, wherein the first cone area and the second cone area are arranged inversely.

The first cone area and the second cone area are both frustoconical or cone shaped. The first cone area and the second cone area both widen out or expand starting out from a cylindrical area being sandwiched between the first cone area and the second cone area.

According to a further embodiment, a cylindrical area is sandwiched between the first cone area and the second cone area, wherein the first cone area and the second cone area both open out starting out from the cylindrical area.

"Open out" in this context means that a diameter of both, the first cone area and the second cone area increases when starting out from the cylindrical area.

According to a further embodiment, the insert comprises a first double cone section and a second double cone section, wherein the first double cone section and the second double cone section are arranged side by side.

Between the first double cone section and the second double cone section, a cylindrical section is arranged. The cylindrical section is part of the outer surface of the insert. Each double cone section has a double scarf joint.

According to a further embodiment, the root bushing further comprises a pultrusion rod that is partly received within a receiving section of the insert.

The pultrusion rod is covered with a plurality of fiber material layers that are wound onto the pultrusion rod.

According to a further embodiment, the receiving section is cone shaped, wherein the pultrusion rod is covered with a plurality of fiber material layers that are arranged in a staggered way to form a cone shaped end that is received within the receiving section.

The frustoconical or cone shaped end and the receiving section of the insert engage each other so that the pultrusion rod is attached to the insert.

According to a further embodiment, the root bushing further comprises two C-shaped pultrusion wedges, wherein the insert and the pultrusion rod are sandwiched between the two C-shaped pultrusion wedges.

The C-shaped pultrusion wedges have a C-shaped cross section. Before placing the C-shaped pultrusion wedges at the root bushing, the insert and the pultrusion rod are both covered with at least one closing fiber material layer. After the C-shaped pultrusion wedges are placed at the insert and the pultrusion rod being received in the receiving section of the insert, a resin is applied to the root bushing. This can be done by the afore-mentioned RTM process.

Furthermore, a wind turbine rotor blade for a wind turbine is provided. The wind turbine rotor blade comprises a plurality of root bushings as explained before.

The number of root bushings is arbitrary. The root bushings are part of the blade root of the wind turbine rotor blade.

Additionally, a method for manufacturing a root bushing for a wind turbine rotor blade is provided. In embodiments, the method comprises the following steps: a) providing an insert, b) embedding the insert in a plurality of fiber material layers, c) impregnating the fiber material layers with a resin, and d) forming a double scarf joint by at least a part of the fiber material layers for transferring loads from the insert to the fiber material layers and vice versa.

Step a) can include manufacturing the insert. A plurality of inserts can be provided during step a). In step b), the fiber material layers can be wound on the insert. This can be done by a tape winding machine. The double scarf joint is formed during step d) by placing the fiber material layers in the double cone section of the outer surface of the insert. Steps c) and d) are performed at the same time. In other words, the double scarf joint is formed when the fiber material layers are impregnated with the resin.

According to an embodiment, two inserts are provided, wherein a pultrusion rod is provided, wherein each insert comprises a receiving section for receiving the pultrusion rod, and wherein the pultrusion rod is sandwiched between the two inserts.

The two inserts and the pultrusion rod form a blank. The blank is used to produce two identical root bushings. The pultrusion rod is sandwiched between the two inserts before impregnating with the resin during step c).

According to a further embodiment, a plurality of fiber material layers is wound on the pultrusion rod in a staggered way to form two cone shaped ends on the pultrusion rod, wherein each cone shaped end is received in one of the receiving sections of the two inserts.

The pultrusion rod and the fiber material layers together form a rod arrangement that is received in the receiving sections of the inserts.

According to a further embodiment, the pultrusion rod and the two inserts are sandwiched between two C-shaped pultrusion wedges to form a blank.

After placing the two C-shaped pultrusion wedges in place, the blank is impregnated with the resin. An RTM mold can be used for this purpose.

According to a further embodiment, the blank is cut into two root bushings.

Thus, scrap can be omitted. This helps to reduce material costs.

According to a further embodiment, the blank is cut in such a way that each root bushing comprises a face that is obliged toward a symmetry axis of the insert.

In an embodiment, an angle between the face and the symmetry axis is less than 90°, preferably less than 80°, more preferably less than 70°, more preferably less than 60°, more preferably less than 50°, more preferably less than 40°, more preferably less than 30°, more preferably less than 20°, more preferably less than 10°.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
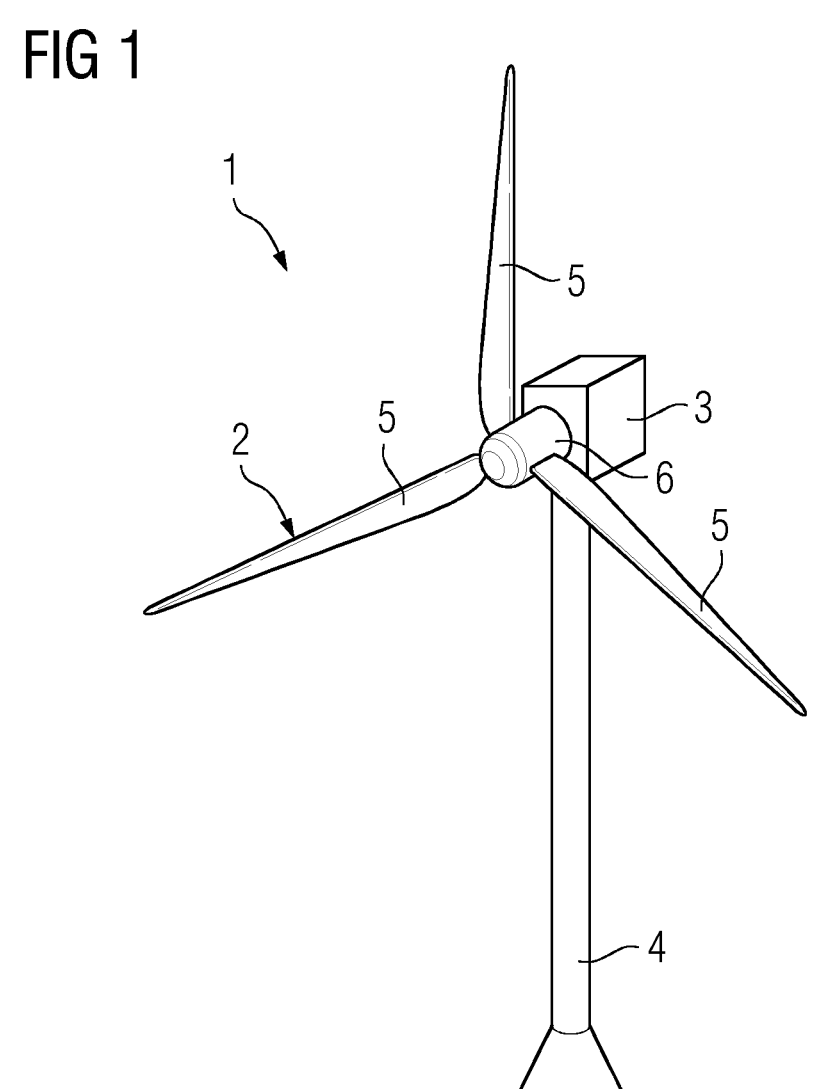
FIG. 1 shows a perspective view of a wind turbine according to one embodiment.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1. The tower 4 can be named wind turbine tower.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
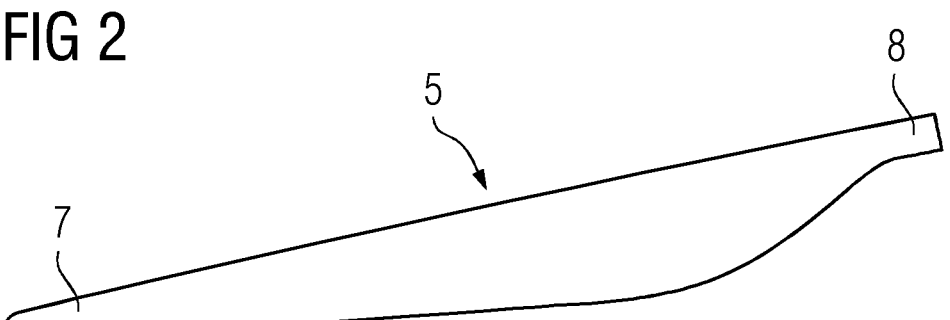
FIG. 2 shows a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

Figure 3:
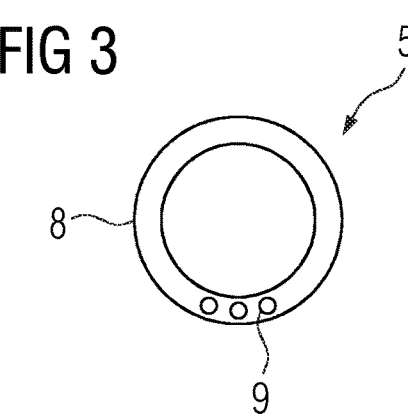
FIG. 3 is an end view of the wind turbine rotor blade according to FIG. 2.

FIG. 3 shows an end view of the blade root 8.

The blade root 8 comprises a plurality of root bushings 9 for a releasable connection of the rotor blade 5 to the hub 6. The root bushings 9 are embedded in the blade root 8 so that bolts (not shown) can be screwed into an internal thread of the root bushings 9 for a firm but releasable engagement therewith. The number of root bushings 9 is arbitrarily. In FIG. 3 only three root bushings 9 are shown. In the following, only one root bushing 9 will be referred to.

Figure 4:
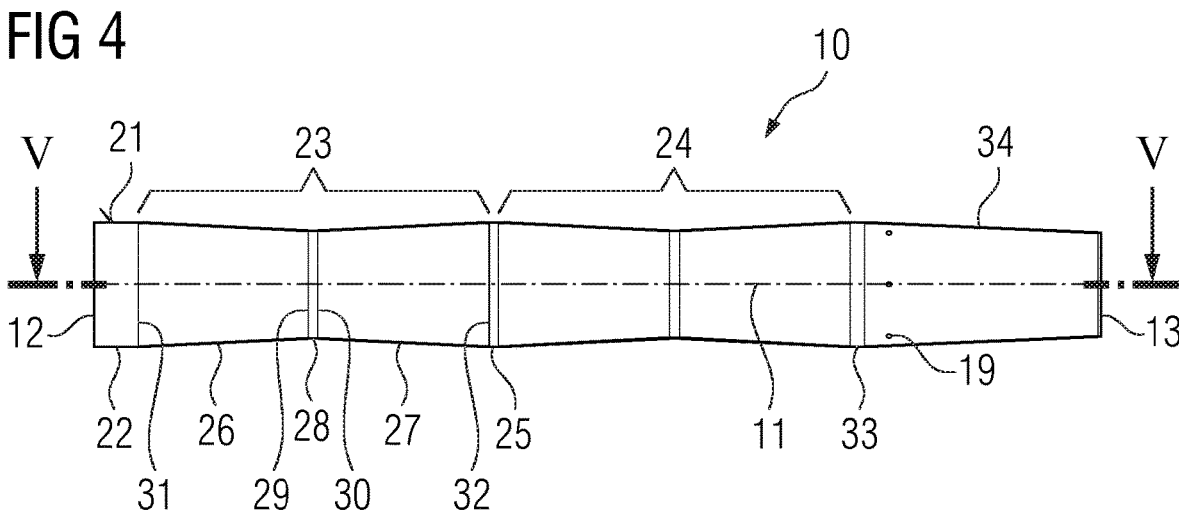
FIG. 4 shows a side view of an insert according to one embodiment.
Figure 5:
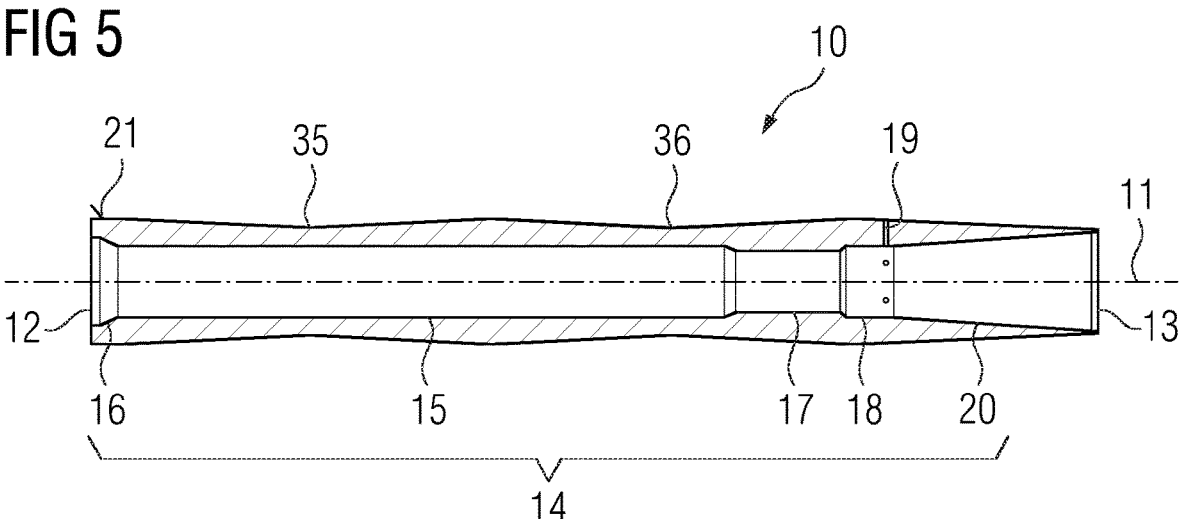
FIG. 5 shows a cross-sectional view of the insert according to the intersection line V-V of FIG. 4.

FIG. 4 shows a side view of an insert 10 according to one embodiment. FIG. 5 shows a cross-sectional view of the insert 10 according to the intersection line V-V of FIG. 4. In the following, FIGS. 4 and 5 are referred to at the same time.

The insert 10 is part of the root bushing 9. The insert 10 can be made of metal. For example, the insert 10 is made of steel or aluminum. The insert 10 is rotationally symmetrical to a symmetry axis 11. The insert 10 has a first end 12 and a second end 13 facing away from the first end 12. The insert 10 has a central bore 14 that protrudes throughout the total insert 10 from the first end 12 toward the second end 13.

The bore 14 has a first section 15 comprising a cone-shaped chamfer 16. The first section 15 is cylinder-shaped. The first section 15 is followed by a thread section 17. The thread section 17 has an internal thread. The thread section 17 has a smaller inner diameter than the first section 15. For example, the thread section 17 has an inner diameter of M36. The thread section 17 is sandwiched between the first section 15 and a second section 18. The second section 18 is cylindrical.

A plurality of bores 19 that are oriented perpendicular toward the symmetry axis 11 are provided at the second section 18. The bores 19 discharge into the second section 18. Only one of the bores 19 is provided with a reference sign in FIGS. 4 and 5. In an embodiment, the second section 18 has the same inner diameter as the first section 15.

The bore 14 further comprises a receiving section 20 that is arranged adjacent to the second section 18. The receiving section 20 has a frustoconical or conical shape. That means that the receiving section 20 is frustoconical or cone shaped. Starting out from the second section 18, the receiving section 20 expands towards the second end 13 of the insert 10. That means that an inner diameter of the receiving section 20 increases when starting out from the second section 18 toward the second end 13.

The insert 10 has an outer surface 21. The surface 21 is rotationally symmetrical to the axis of symmetry 11. The surface 21 comprises a cylindrical section 22. The surface 21 further comprises two double cone sections 23, 24. The double cone sections 23, 24 are identical. A cylindrical section 25 is sandwiched between the double cone sections 23, 24. The cylindrical section 25 has the same outer diameter as the cylindrical section 22. The number of double cone sections 23, 24 is arbitrary. In an embodiment, there are provided two double cone sections 23, 24, namely a first double cone section 23 and a second cone section 24.

Each double cone section 23, 24 comprises a first cone area 26 and a second cone area 27. The cone areas 26, 27 are frustoconical or cone shaped. A cylindrical area 28 is sandwiched between the two cone areas 26, 27. The cylindrical area 28 has a smaller outer diameter than the cylindrical sections 22, 25. The two cone areas 26, 27 of each double cone section 23, 24 are arranged oppositely or inverse. "Opposite" or "inverse" in this context means that the cone areas 26, 27 are arranged such that tips 29, 30 of the cone areas 26, 27 are turned to each other and that bases 31, 32 of the cone areas 26, 27 are turned away from each other. "Tip" and "base" in this context means that the tips 29, 30 have smaller outer diameters than the bases 31, 32. The first cone area 26 is connected to the cylindrical area 28 with its tip 29 and to the cylindrical section 22 with its base 31. The second cone area 27 is connected to the cylindrical area 28 with its tip 30 and to the cylindrical section 25 with its base 32.

The second double cone section 24 is sandwiched between the cylindrical section 25 and a further cylindrical section 33. The cylindrical sections 22, 25, 33 all have the same outer diameter. Neighbored to the cylindrical section 33 is provided a cone section 34 that has a frustoconical or cone shape. The cone section 34 narrows toward the second end 13 of the insert. The bores 19 are provided at the cone section 34.

The first section 15 of the bore 14 runs through the first double cone section 23 and ends in the second cone area 27 of the second double cone section 24. The thread section 17 starts and ends in the second cone area 27 of the second double cone section 24. The receiving section 20 runs through the cone section 34 and ends at the second end 13 of the insert 10.

The first double cone section 23 forms a first deepening or first scarf 35 on the surface 21. Accordingly, the second double cone section 24 forms a second deepening or second scarf 36 on the surface 21. The scarfs 35, 36 are formed identical. Seen along the symmetry axis 11, the scarfs 35, 36 are arranged side by side.

Figure 6:
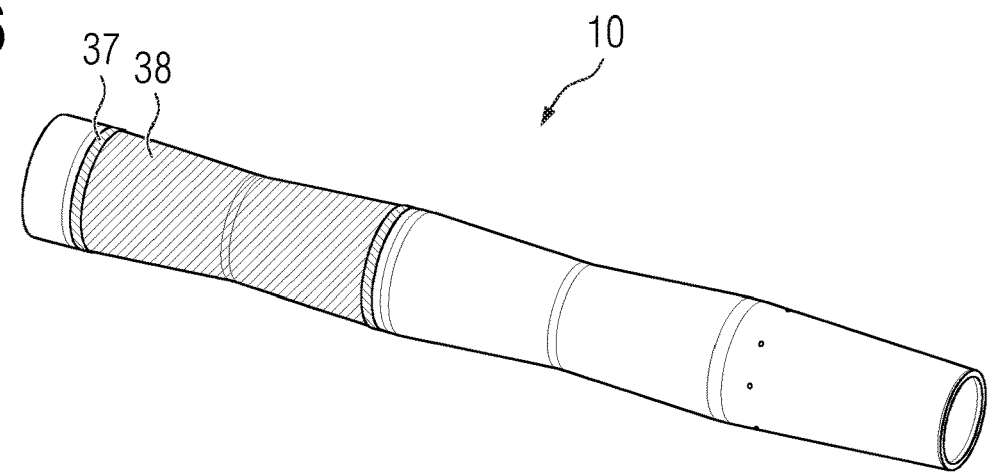
FIG. 6 shows a perspective view of the insert according to FIG. 4.
Figure 7:
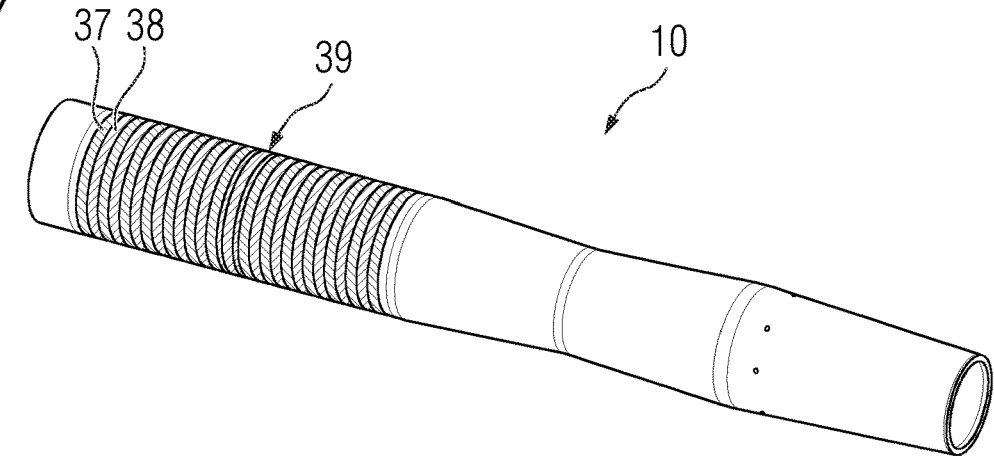
FIG. 7 shows a further perspective view of the insert according to FIG. 4.
Figure 8:
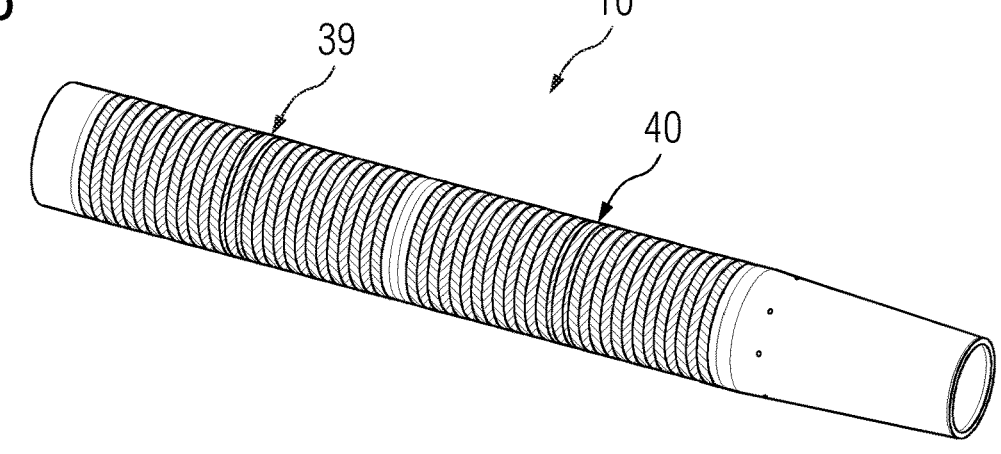
FIG. 8 shows a further perspective view of the insert according to FIG. 4.
Figure 9:
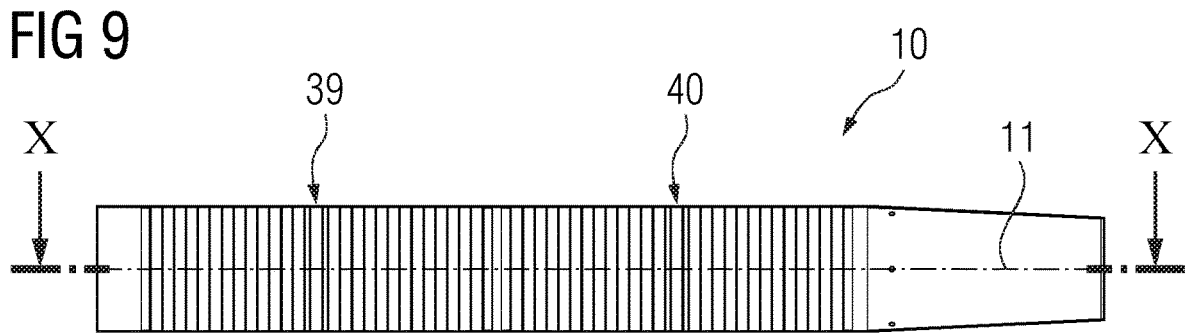
FIG. 9 shows a further side view of the insert according to FIG. 4.
Figure 10:
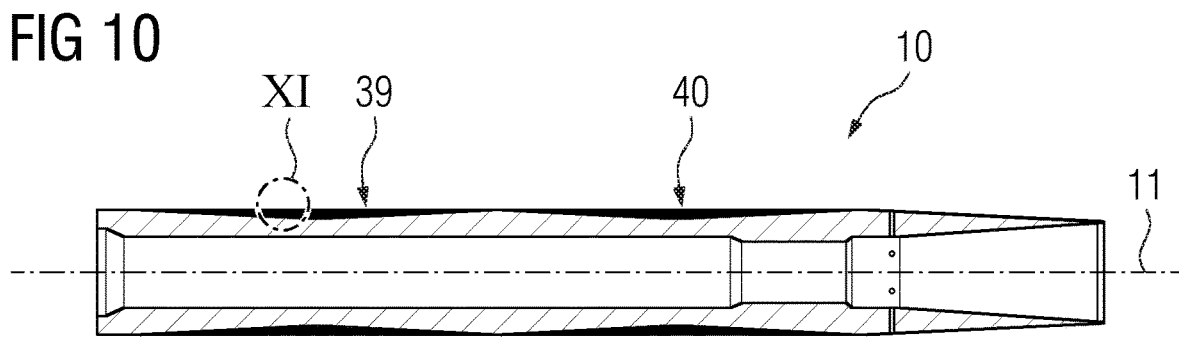
FIG. 10 shows a further cross-sectional view of the insert according to the intersection line X-X of FIG. 4.
Figure 11:
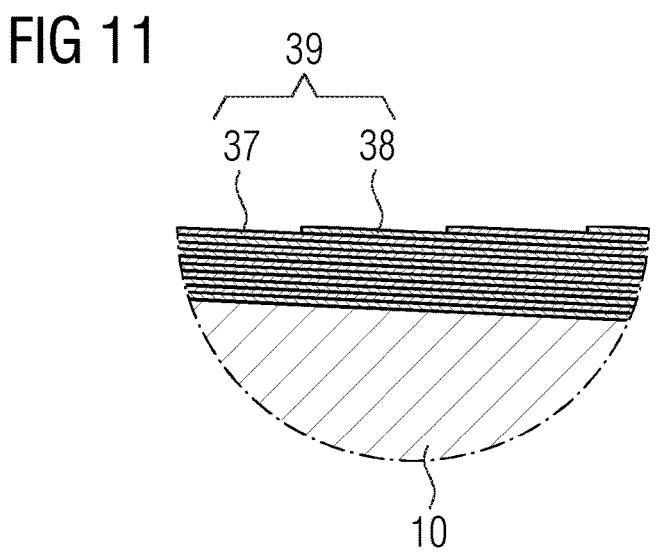
FIG. 11 shows the detail view XI according to FIG. 10.

FIGS. 6 to 8 each show a perspective view of the insert 10. FIG. 9 shows a side view of the insert 10. FIG. 10 shows a cross-sectional view of the insert 10 according to the intersection line X-X of FIG. 9. FIG. 11 shows the detail view XI according to FIG. 10. In the following, FIGS. 6 to 11 will be referred to at the same time.

To produce the root bushing 9, the insert 10 is fixed in a tape winding machine (not shown). A first fiber material layer 37 (FIG. 6) of dry glass fibers is wound on the first scarf 35. The first fiber material layer 37 is a unidirectional layer (UD-layer) or unidirectional tape with an angle of the glass fibers of 90° or 0° to 90°. Then a second fiber material layer 38 (FIG. 6) of dry glass fibers is wound on the first fiber material layer 37. The second fiber material layer 38 is a unidirectional layer or unidirectional tape with an angle of the glass fibers of 90° or 0° to 90°.

A plurality of fiber material layers 37, 38 of which only two are provided with a reference sign is wound on the first scarf 35 until the first scarf 35 is filled with the fiber material layers 37, 38. The fiber material layers 37, 38 are wound in a stepped or staggered way to fill the double cone shaped first scarf 35 completely. The fiber material layers 37, 38 together form a first scarf joint 39 (FIG. 7).

The second scarf 36 is also filled with a plurality of fiber material layers 37, 38 to form a second scarf joint 40 (FIGS. 8, 9 and 10). The scarf joints 39, 40 are identical. FIG. 11 shows in detail the stepped or staggered configuration of the fiber material layers 37, 38 to form the scarf joints 39, 40.

Figure 12:
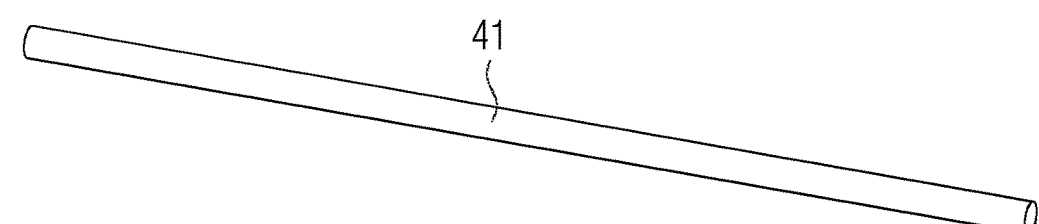
FIG. 12 shows a perspective view of a pultrusion rod according to one embodiment.
Figure 13:
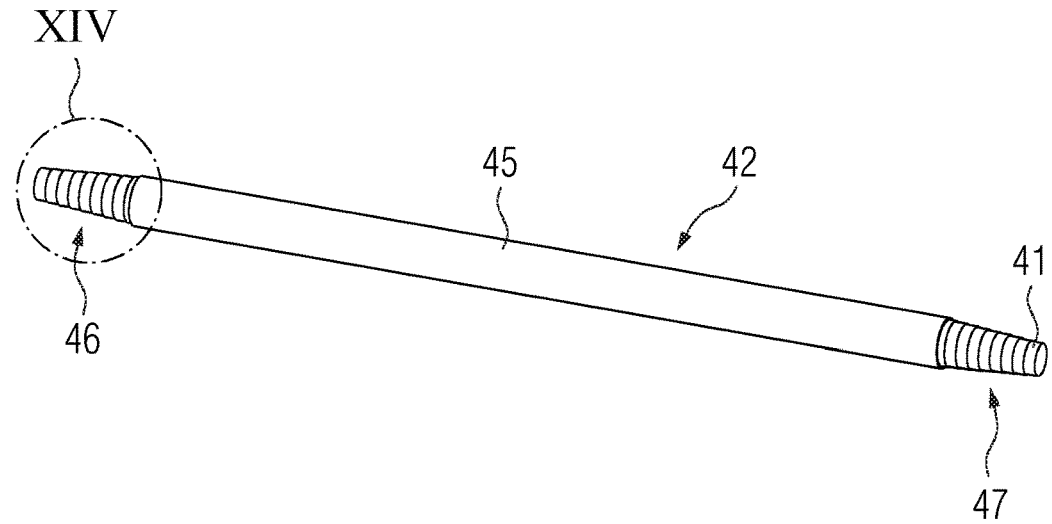
FIG. 13 shows a perspective view of a rod arrangement according to one embodiment.
Figure 14:
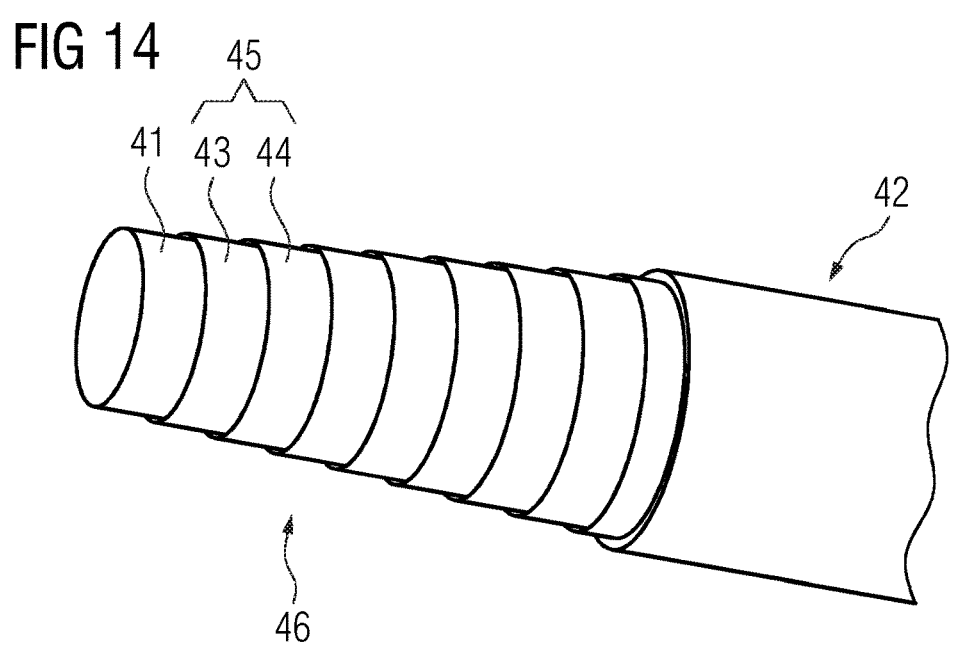
FIG. 14 shows the detail view XIV according to FIG. 13.

FIG. 12 shows a perspective view of a pultrusion rod 41. FIG. 13 shows a perspective view of a rod arrangement 42 comprising the pultrusion rod 41. FIG. 14 shows the detail view XIV according to FIG. 13. In the following, FIGS. 12 to 14 will be referred to at the same time.

The pultrusion rod 41 is cut into a desired length. A plurality of fiber material layers 43, 44 of which only two are provided with reference signs in FIG. 14 are wound on the pultrusion rod 41 in a stepped or staggered way. The fiber material layers 43, 44 are unidirectional layers or unidirectional tapes of dry glass fibers.

All fiber material layers 43, 44 together form a cover 45 that covers the pultrusion rod 41. The pultrusion rod 41 and the cover together form the rod arrangement 42. Due to the stepped or staggered arrangement of the fiber material layers 43, 44, the rod arrangement 42 has two frustoconical or cone shaped ends 46, 47, namely a first end 46 and a second end 47.

Figure 15:
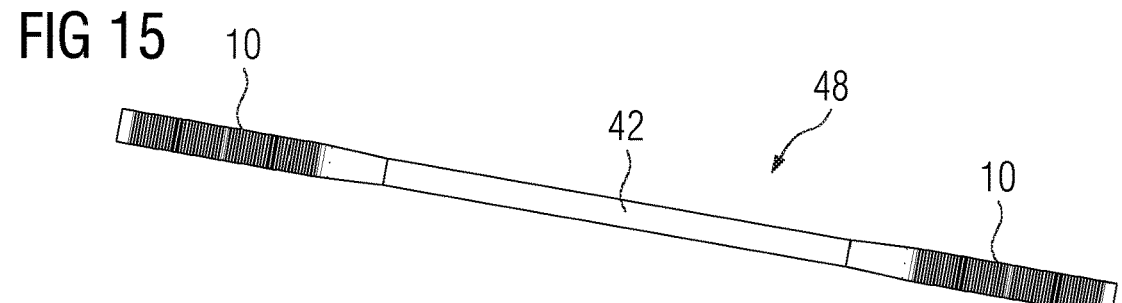
FIG. 15 shows a perspective view of a blank according to one embodiment.
Figure 16:
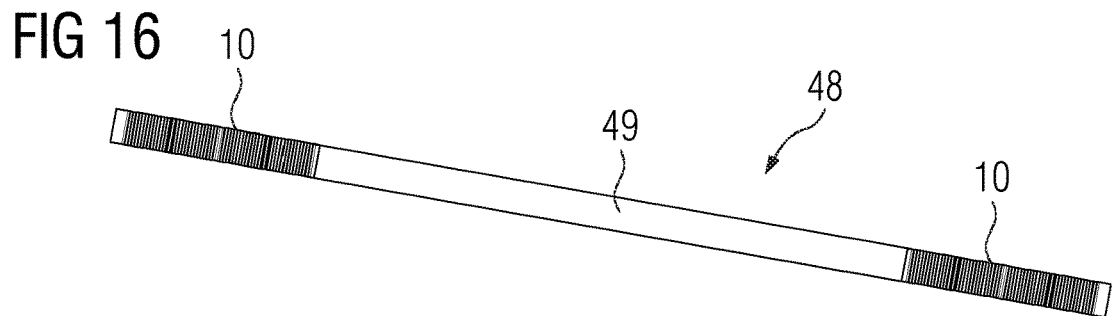
FIG. 16 shows a further perspective view of the blank according to FIG. 15.
Figure 17:
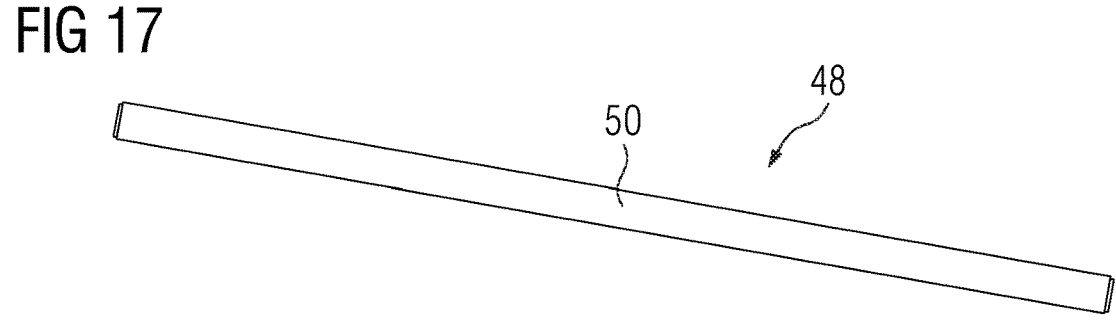
FIG. 17 shows a further perspective view of the blank according to FIG. 15.

FIGS. 15 to 17 each show a perspective view of a blank 48 for producing the root bushing 9. In the following, FIGS. 15 to 17 will be referred to at the same time.

To produce the blank 48, the rod arrangement 42 is inserted with its ends 46, 47 into the receiving sections 20 of two inserts 10 (FIG. 15). Both inserts 10 comprise the wound scarf joints 39, 40. Then, a plurality of fiber material layers 49 of glass fibers is wound on the rod arrangement 42 so that the fiber material layers 49 have the same outer diameter as the inserts 10 (FIG. 16). The fiber material layers 49 are unidirectional layers or unidirectional tapes.

Then, the inserts 10 and the fiber material layers 49 are completely covered with a closing fiber material layer 50 (FIG. 17). The fiber material layer 50 is a glass fiber layer. The fiber material layer 50 is a unidirectional layer or unidirectional tape.

Figure 18:
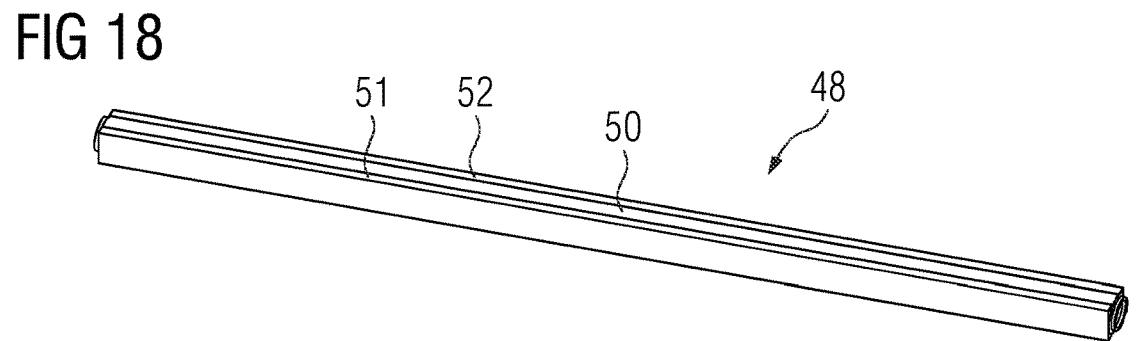
FIG. 18 shows a further perspective view of the blank according to FIG. 15.
Figure 19:
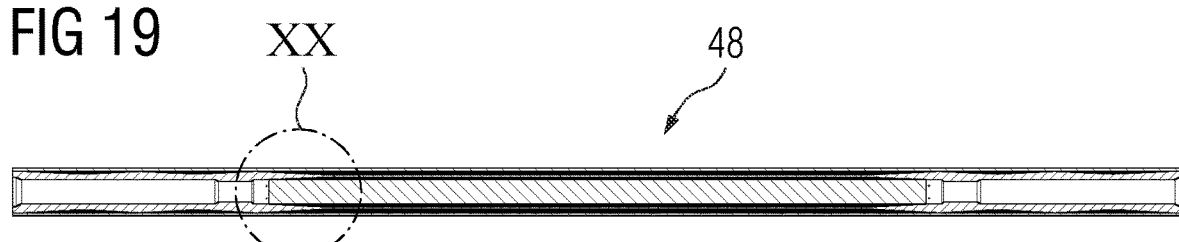
FIG. 19 shows a cross-sectional view of the blank according to FIG. 15.
Figure 20:
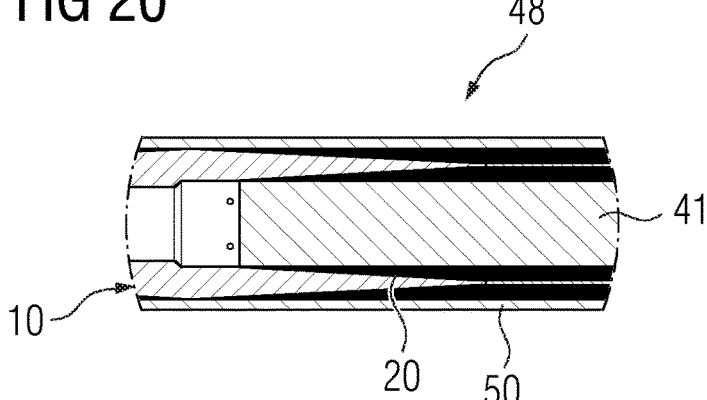
FIG. 20 shows the detail view XX according to FIG. 19.

FIG. 18 shows a further perspective view of the blank 48. FIG. 19 shows a cross-sectional view of the blank 48. FIG. 20 shows the detail view XX according to FIG. 19. In the following, FIGS. 18 to 20 will be referred to at the same time.

Two C-shaped pultrusion wedges 51, 52 are placed on the blank 48. The pultrusion wedges 51, 52 are part of the blank 48. The blank is then placed in a mold (not shown), in particular in a resin transfer molding (RTM) mold. The fiber material of the fiber material layers 37, 38, 43, 44, 49, 50 is then impregnated with a resin, for example with an epoxy resin, and cured subsequently to join all the parts of the blank 48 together.

Figure 21:
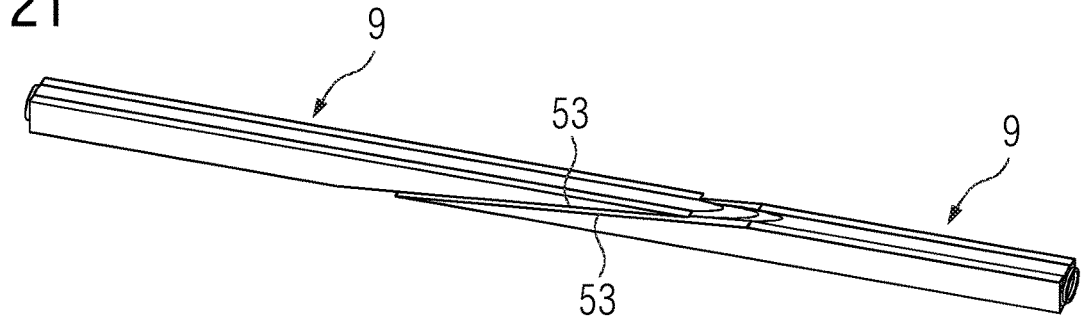
FIG. 21 shows a perspective view of two root bushings according to one embodiment.
Figure 22:
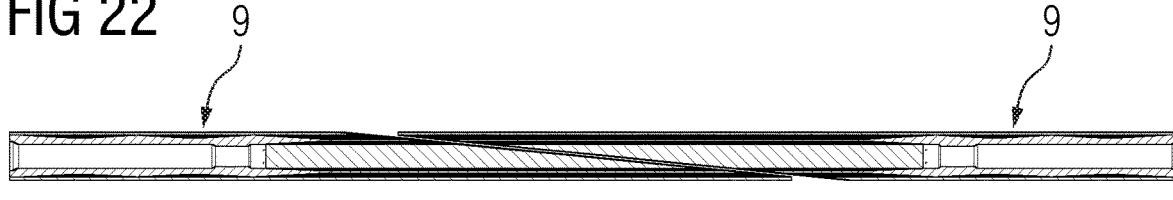
FIG. 22 shows a cross-sectional view of the root bushings according to FIG. 21.

FIG. 21 shows a perspective view of two root bushings 9 made from the blank 48. FIG. 22 shows a cross-sectional view of the two root bushings 9. In the following, FIGS. 21 and 22 will be referred to at the same time.

To receive the root bushings 9 from the blank 48, the blank 48 is split into two root bushings 9 by cutting the blank 48 with an oblique angle. Each root bushing 9 then has an oblique face 53.

Figure 23:
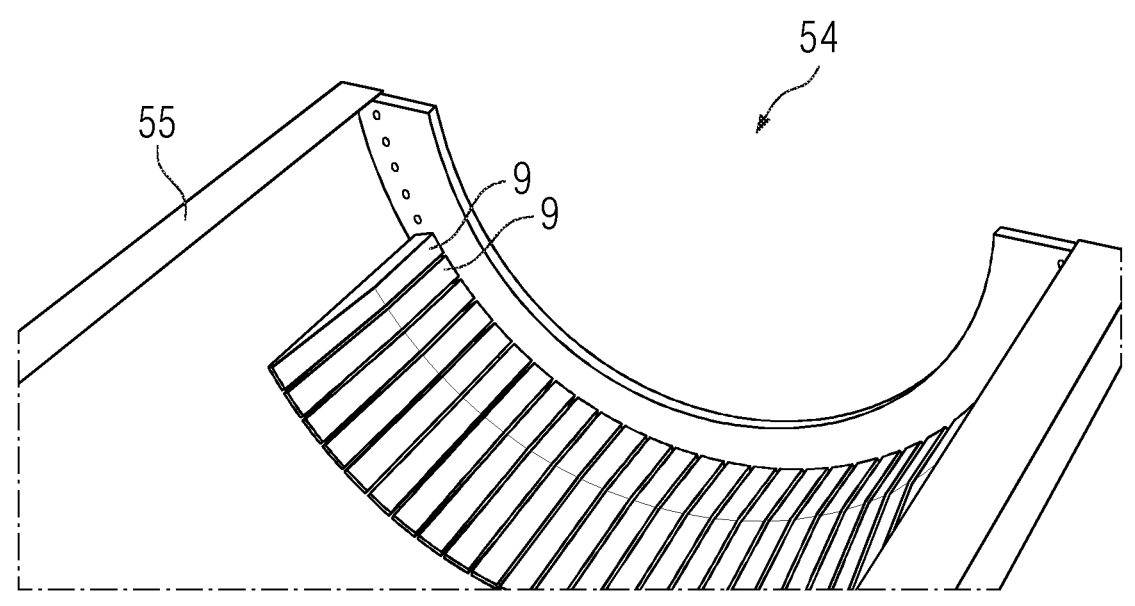
FIG. 23 shows a perspective view of a mold according to one embodiment.

FIG. 23 shows a perspective view of a mold 54 for producing the rotor blade 5.

The mold 54 has two mold halves 55 of which only one is shown in FIG. 23. A plurality of root bushings 9 is placed in the mold 54. Then, fiber material is placed on the root bushings 9. The fiber material is then impregnated with resin and cured. After demolding, the rotor blade 5 can be finished.

Figure 24:
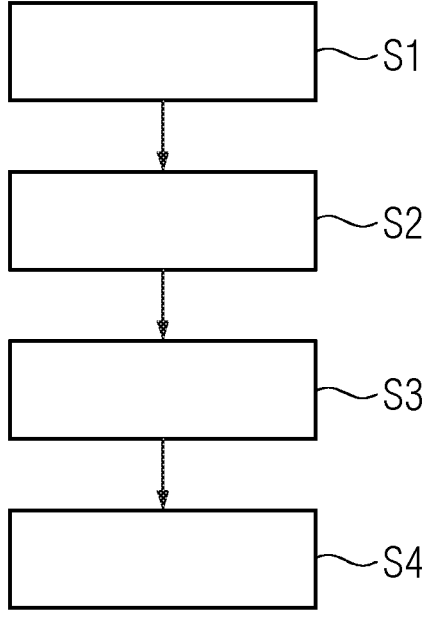
FIG. 24 shows a schematic block diagram of a method for producing the root bushings according to FIG. 21.

FIG. 24 shows a schematic block diagram of a method for producing the root bushing 9.

In a step S1, the insert 10 is provided. Providing the insert 10 can comprise manufacturing the insert 10. The insert 10 is embedded in a step S2 in a plurality of fiber material layers 37, 38, 50. In a step S3, the fiber material layers 37, 38, 50 are impregnated with a resin.

In a step S4, the double scarf joint 39, 40 is formed by at least a part of the fiber material layers 37, 38, 50 for transferring loads from the insert 10 to the fiber material layers 37, 38, 50 and vice versa.

Two inserts 10 can be provided in step S1, wherein the pultrusion rod 41 is provided and wherein each insert 10 comprises a receiving section 20 for receiving the pultrusion rod 41. The pultrusion rod 41 is sandwiched between the two inserts 10.

A plurality of fiber material layers 43, 44 can be wound on the pultrusion rod 41 in a staggered way to form two cone shaped ends 46, 47 on the pultrusion rod 41, wherein each cone shaped end 46, 47 is received in the receiving sections 20 of the two inserts 10.

The pultrusion rod 41 and the two inserts 10 are sandwiched between the two C-shaped pultrusion wedges 51, 52 to form the blank 48. Then, the blank 48 is cut into two root bushings 9. The blank 48 is cut in such a way that each root bushing 9 comprises the slanted face 53 that is obliged toward the symmetry axis 11 of the root bushing 9.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A root bushing for a wind turbine rotor blade, comprising:

an insert having a first end, a second end, and a bore extending from the first end to the second end, wherein the insert further includes a thread section configured to engage a bolt insertable within the bore through the first end, and a receiving section having an inner diameter that gradually increases toward the second end;

a first plurality of fiber material layers wound around an outer surface of the insert to embed the insert in the first plurality of fiber material layers, wherein the outer surface is dimensioned to form a first scarf and a second scarf such that at least a part of the first plurality of fiber material layers forms a double scarf joint for transferring loads from the insert to the first plurality of fiber material layers, and vice versa; and a rod arrangement partly received within the receiving section through the second end of the insert, the rod arrangement comprising a pultrusion rod covered by a second plurality of fiber material layers, wherein the pultrusion rod has a frustoconical or cone-shaped end inserted into receiving section;

wherein at least a part of the first plurality of fiber material layers contacts the outer surface of the insert at the receiving section and at least a part of the second plurality of fiber material layers contacts an inner surface of the insert at the receiving section;

wherein the outer surface comprises a first double cone section, a second double cone section, and a cylindrical section sandwiched between the first double cone section and the second double cone section, each of the first double cone section and the second double cone section comprising a first cone area and a second cone area, the first cone area and the second cone area being arranged inversely, further wherein a cylindrical area is sandwiched between the first cone area and the second cone area, the first cone area and the second cone area both open out starting out from the cylindrical area;

wherein the cylindrical area has a smaller outer diameter than the cylindrical section;

wherein each of the first and second double cone sections is filled with the first plurality of fiber material layers arranged in a stepped or staggered way to form the double scarf joint.

2. The root bushing according to claim 1, wherein the double scarf joint is formed at the first double cone section and/or the second double cone section.

3. The root bushing according to claim 1, wherein the receiving section is cone shaped, and the second plurality of fiber material layers are arranged in a staggered way to form the cone shaped end that is received within the receiving section.

4. The root bushing according to claim 1, further comprising two C-shaped pultrusion wedges, wherein the insert and the pultrusion rod are sandwiched between the two C-shaped pultrusion wedges.

5. A wind turbine rotor blade for a wind turbine, comprising a plurality of root bushings according to claim 1.

6. The root bushing according to claim 1, wherein a section of the rod arrangement that extends from the second end of the insert is cut, leaving an oblique face at a cut end of the rod arrangement.

7. The root bushing according to claim 1, further comprising a closing fiber material layer covering the insert and the second plurality of fiber material layers.

8. The root bushing according to claim 1, wherein the first plurality of fiber material layers are wound on the insert in a dry state and subsequently impregnated with a resin in a resin transfer molding process.

9. A method for manufacturing a root bushing for a wind turbine rotor blade, the method comprising:

a) providing two inserts, each insert having a first end, a second end, and a bore extending from the first end to the second end, wherein the insert further includes a thread section configured to engage a bolt insertable within the bore through the first end, and a receiving section having an inner diameter that gradually increases toward the second end;

b) embedding the two inserts in a first plurality of fiber material layers;

c) impregnating the first plurality of fiber material layers with a resin;

d) forming a double scarf joint at each insert by at least a part of the first plurality of fiber material layers for transferring loads from the two inserts to the first plurality of fiber material layers, and vice versa;

e) providing a pultrusion rod covered by a second plurality of fiber material layers; and f) engaging the pultrusion rod with the receiving section of the two inserts to sandwich the pultrusion rod between the two inserts;

wherein at least a part of the first plurality of fiber material layers contacts the outer surface of each insert at the receiving section and at least a part of the second plurality of fiber material layers contacts an inner surface of each insert at the receiving section;

wherein the outer surface comprises a first double cone section, a second double cone section, and a cylindrical section sandwiched between the first double cone section and the second double cone section, each of the first double cone section and the second double cone section comprising a first cone area and a second cone area, the first cone area and the second cone area being arranged inversely, further wherein a cylindrical area is sandwiched between the first cone area and the second cone area, the first cone area and the second cone area both open out starting out from the cylindrical area;

wherein the cylindrical area has a smaller outer diameter than the cylindrical section;

wherein each of the first and second double cone sections is filled with the first plurality of fiber material layers arranged in a stepped or staggered way to form the double scarf joint.

10. The method according to claim 9, wherein the second plurality of fiber material layers is wound on the pultrusion rod in a staggered way to form two cone shaped ends on the pultrusion rod, and wherein each cone shaped end is received in one of the receiving sections of the two inserts.

11. The method according to claim 9, wherein the pultrusion rod and the two inserts are sandwiched between two C-shaped pultrusion wedges to form a blank.

12. The method according to claim 11, wherein the blank is cut into two root bushings.

13. The method according to claim 12, wherein the cut is made at an oblique angle.

* * * * *